US006891540B2

(12) United States Patent
Liao et al.

(10) Patent No.: US 6,891,540 B2
(45) Date of Patent: May 10, 2005

(54) APPARATUS AND METHOD FOR LINE DRAWING

(75) Inventors: Ming-Hao Liao, Taipei (TW); Yung-Feng Chiu, Miaoli (TW); Chung-Yen Lu, Taipei (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 177 days.

(21) Appl. No.: 10/271,755

(22) Filed: Oct. 17, 2002

(65) Prior Publication Data

US 2004/0075660 A1 Apr. 22, 2004

(51) Int. Cl.[7] ............................. G09G 5/02; G06T 11/20
(52) U.S. Cl. ....................... 345/441; 345/586; 345/592; 345/601; 345/643; 345/612
(58) Field of Search ................................. 345/418, 421, 345/586, 592, 601, 619, 629, 630, 643, 426, 428, 441, 443, 420, 468, 581, 690, 589, 698, 606, 610, 612, 618, 442; 382/202–203, 258, 266

(56) References Cited

U.S. PATENT DOCUMENTS 5,724,561 A * 3/1998 Tarolli et al. ............... 345/561

6,587,113 B1 * 7/2003 Baldwin et al. ............. 345/557

* cited by examiner

Primary Examiner—Matthew C. Bella
Assistant Examiner—Wesner Sajous
(74) Attorney, Agent, or Firm—Birch, Stewart, Kolasch & Birch, LLP

(57) ABSTRACT

An apparatus for line drawing using a plurality of pixels to display a line, including a first parameter generating module, a second parameter generating module, a storage module, a retrieving module, and a calculating module. In this case, the first parameter generating module generates a first parameter according to a slope of the line. The second parameter generating module generates a second parameter according to the distance between one of the pixels and the line in axial directions. The storage module stores an index table, which records at least a blending factor and the correlations between the first parameter, second parameter, and blending factor. Therefore, the retrieving module searches for the blending factor from the index table according to the first and second parameter. Finally, the calculating module determines the color of this pixel according to the blending factor.

18 Claims, 4 Drawing Sheets

| | $u_1$ | $u_2$ | $u_3$ | ... |
|---|---|---|---|---|
| $v_1$ | $\alpha_{11}$ | $\alpha_{21}$ | $\alpha_{31}$ | ... |
| $v_2$ | $\alpha_{12}$ | $\alpha_{22}$ | $\alpha_{32}$ | ... |
| $v_3$ | $\alpha_{13}$ | $\alpha_{23}$ | $\alpha_{33}$ | ... |
| ... | ... | ... | ... | ... |

APPARATUS AND METHOD FOR LINE DRAWING

BACKGROUND OF THE INVENTION

1. Field of Invention

The invention relates to an apparatus and a method for drawing, in particular, to an apparatus and a method for line drawing.

2. Related Art

Data processing systems that are primarily employed for graphics processes are used in many different areas of industry, business, education, and government. Graphics applications for these systems include interactive planning, office automation, electronic publishing, animation, and computer-aided design. Further, graphics processing technology develops rapidly as does the progress of hardware technology, such as data processors.

Referring to FIGS. 1A and 1B, in general, a plurality of pixels, on which a line 10 is drawn, display line color to draw line 10. At the same time other pixels of a displaying apparatus display background color, so that the image of line 10 can be drawn.

However, the image of line 10 is presented as an obvious ladder-shape. In order to solve the problem of the mentioned ladder-shape, skilled individuals determine the color of each pixel according to the distance between each pixel and line 10. In other words, if a pixel is nearer to line 10, the color Color(pixel) of this pixel is closer to the line color Color(line); if a pixel is farther away from line 10, the color Color(pixel) of this pixel is closer to the background color Color(background). Thus the image of line 10 would not be presented as an obvious ladder-shape, and the width of line 10 is also shown. As mentioned above, the color Color (pixel) of pixels is computed by blending the line color Color(line) and the background color Color(background) with a blending factor $\alpha$ as shown in the following formula (1):

$$\text{Color(pixel)} = \alpha \times \text{Color(line)} + (1-\alpha) \times \text{Color(background)} \quad (1)$$

Wherein, the blending factor $\alpha$ is computed according to the slope of line 10 and the distance between each pixel and line 10. In this case, the value of the blending factor is no less than 0 and no greater than 1. As shown in FIG. 2, the slope of line 10 is m, the width of line 10 is $d_{max}$, and the distance between a pixel 20 and line 10 in the vertical axle direction is D. Therefore, the blending factor $\alpha$ is computed following the formula (2):

$$\alpha = \begin{cases} 1 - \dfrac{d}{d_{max}}, & d \leq d_{max} \\ 0, & d > d_{max} \end{cases} \quad (2)$$

Wherein:

$$d = \frac{D}{\sqrt{1+m^2}} \quad (3)$$

Consequently, line 10 displayed following this method, shown in FIG. 2, would not present the mentioned ladder-shape as shown in FIG. 1. However, because the data processor has to calculate the formula (1), (2), and (3) for each of the pixels, in particular, to compute a root while calculating the formula (3), the calculation time required by the data processor increases. Moreover, this affects the display speed, so the image display is delayed. It would be desirable, therefore, to provide an apparatus and a method that would reduce calculation time when computing the blending factors for pixels, so as to avoid delay in drawing the image.

SUMMARY OF THE INVENTION

An objective of the invention is to provide an apparatus and a method for line drawing that will reduce calculation time.

To achieve the above objective, the invention provides an apparatus for line drawing, which includes a first parameter generating module, a second parameter generating module, a storage module, a retrieving module, and a calculating module. In this invention, the first parameter generating module generates a first parameter according to a slope of the line. The second parameter generating module generates a second parameter according to the distance between one of the pixels and the line in axial directions. The storage module stores an index table, which records, at least, a blending factor and the correlations between the first parameter, second parameter, and blending factor. Therefore, the retrieving module searches for the blending factor in the index table according to the first and second parameters. Finally, the calculating module determines the color of this pixel according to the blending factor.

The invention also provides a method for line drawing, which includes a step for generating a first parameter according to the slope of a line, a step for generating a second parameter according to the distance between a pixel and the line in axial directions, a step for searching a blending factor from a index table according to the first and second parameters, and determining the color of this pixel according to the blending factor.

Since the disclosed apparatus and method for line drawing can search the index table for the blending factor, the disclosed apparatus and method are not required to execute complex calculations, such as root calculation. Therefore, the calculation time can be reduced so as to avoid delay in drawing the line.

BRIEF DESCRIPTION OF THE DRAWINGS

The invention will become more fully understood from the detailed description given in the hereinbelow illustration only, and thus are not limitative of the invention, and wherein.

DETAILED DESCRIPTION OF THE INVENTION

The invention will be apparent from the following detailed description, which proceeds with reference to the accompanying drawings, wherein the same references relate to the same elements.

Figure 1A:
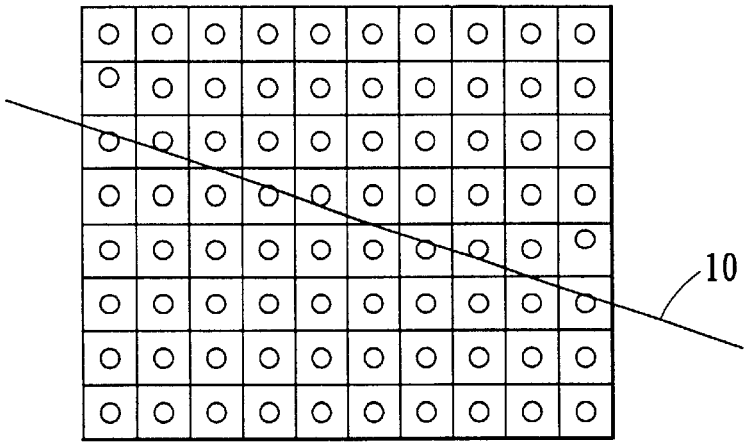
FIGS. 1A and 1B are schematic views showing a traditional apparatus for line drawing, wherein only the pixels that the line passes through display the line color.
Figure 1B:
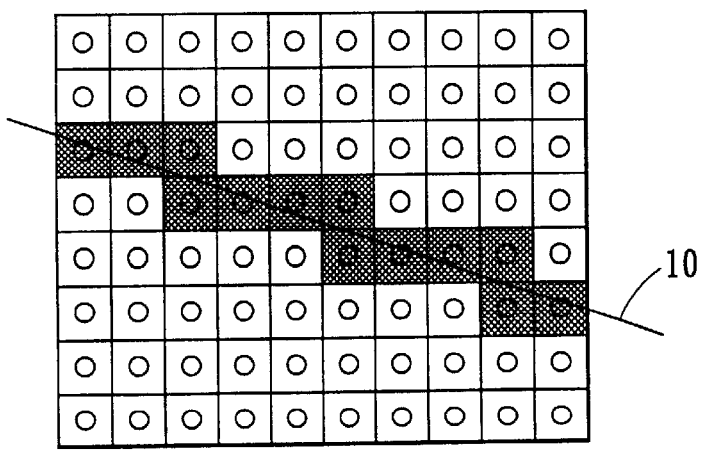
Figure 2:
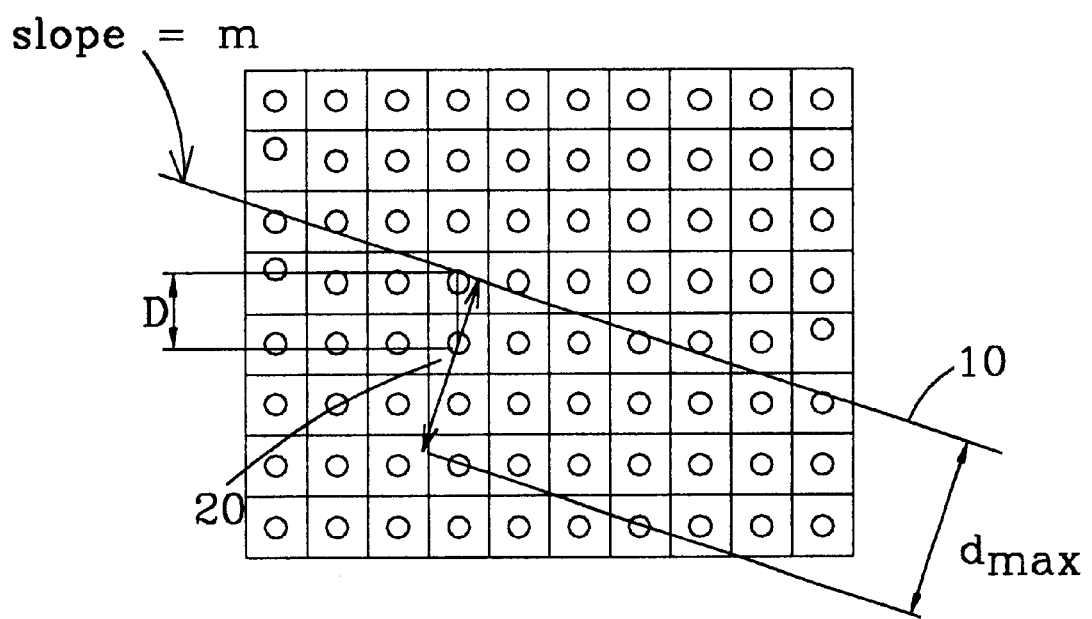
FIG. 2 is a schematic view showing another traditional apparatus for line drawing, wherein the color of each of the pixels is determined depending on the distance between this pixel and the line.
Figures 3, 4:
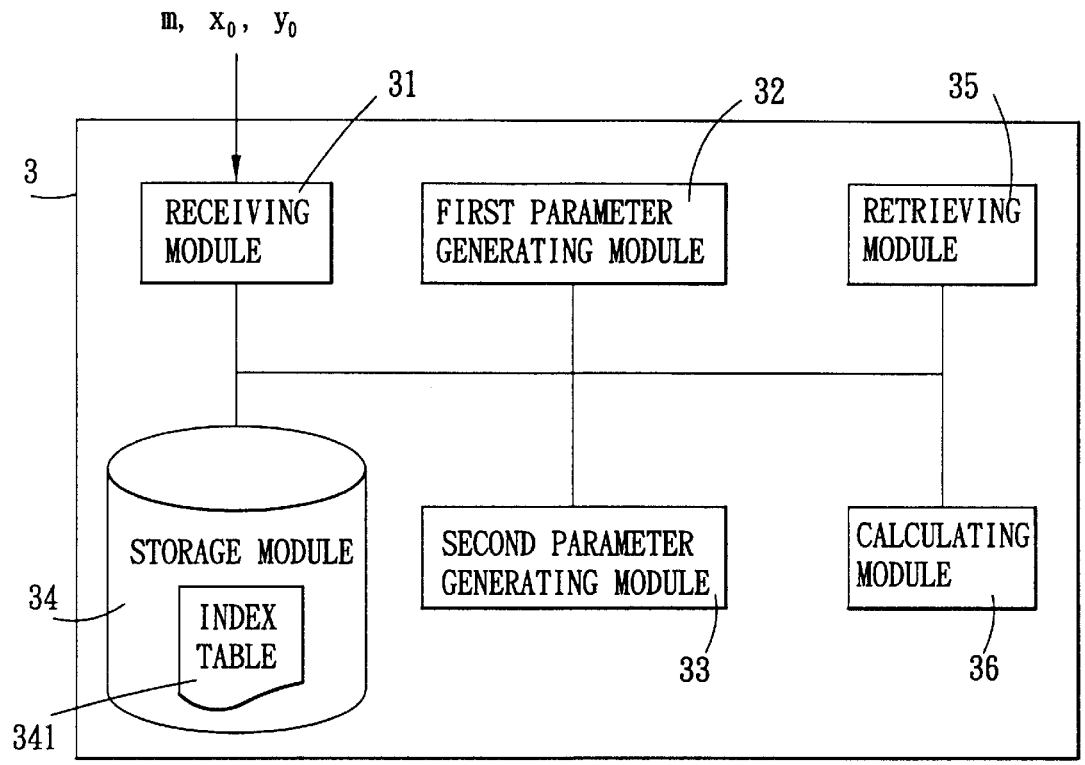
FIG. 3 is a schematic view showing the apparatus for line drawing according to a preferred embodiment of the invention.
FIG. 4 is a schematic table showing the data recorded in the index table of the apparatus shown in FIG. 3.

With reference to FIG. 3, an apparatus 3 for line drawing includes a receiving module 31, a first parameter generating module 32, a second parameter generating module 33, a storage module 34, a retrieving module 35, and a calculating module 36.

In this embodiment, the apparatus 3 uses a plurality of pixels to display a line. This line is presented as the following formula (4):

$$y = ax + b \tag{4}$$

The apparatus 3 determines the color of each of the pixels according to the distance between the pixel and the line. Then, the line is displayed. Hereafter, the calculations of these modules of apparatus 3 will be described.

The receiving module 31 receives the slope m of the line and the distance between one of the pixels and the line in axial directions. As shown in formula (4), the slope m of the line is a. In this embodiment, the distance between this pixel and the line in vertical direction is $y_0$, and the distance between this pixel and the line in horizontal axle direction is $x_0$.

The first parameter generating module 32 generates a first parameter u according to the slope m. In this embodiment, when the absolute value of slope m is less than 1, the first parameter u is equal to the absolute value of slope m. When the absolute value of slope m is equal to or larger than 1, the first parameter u is equal to the reciprocal of the absolute value of slope m. The first parameter u is computed as the following formula (5):

$$u = \begin{cases} m, & |m| < 1 \\ 1/m, & |m| \geq 1 \end{cases} \tag{5}$$

The second parameter generating module 33 generates a second parameter v according to the distance between one of the pixels and the line in axial directions. In this embodiment, when the absolute value of slope m is less than 1, the second parameter v is calculated according to $y_0$. Whereas, when the absolute value of slope m is equal to or greater than 1, the second parameter v is calculated according to $x_0$. The second parameter v is computed as the following formula (6):

$$v = \begin{cases} \dfrac{y_0}{\sqrt{2} \times d_{\max}}, & |m| < 1 \\ \dfrac{x_0}{\sqrt{2} \times d_{\max}}, & |m| \geq 1 \end{cases} \tag{6}$$

Wherein, $d_{max}$ is the width of the line.

As mentioned above, the first and second parameters are both no greater than 1.

The storage module 34 stores an index table 341, which records at least a blending factor α and the correlations between the first parameter u, second parameter v, and blending factor α. In this case, the data structure of index table 341 is shown in FIG. 4. The value of each α entry is pre-calculated as a texture map using the following formulas (7):

$$\alpha = \text{Index} \cdot \text{table}(u, v) = 1 - \frac{\sqrt{2} \times v}{\sqrt{1 + u^2}} \tag{7}$$

Wherein,

0<u<1

0<v<1

The retrieving module 35 receives the first parameter u and the second parameter v and searches for the blending factor α from the index table 341 according to the value of u and v. This is different from the prior art, which computes the blending factor α by calculating the formulas (2) and (3). As a result, the calculation time for computing the blending factor α is shortened, and the load on the data processor is reduced. As previously mentioned, the value of the blending factor α is between 0 and 1, including both 0 and 1.

The calculating module 36 determines the color Color (pixel) of this pixel according to the blending factor α. In this case, the calculating module 36 determines the ratios of line color Color(line) and background color Color (background) according to the mentioned formula (1).

Furthermore, the apparatus 3 according to a preferred embodiment of this invention includes an additional determining module (not shown in the figure). After the receiving module 31 obtains the slope m, the determining module determines whether the absolute value of slope m is less than 1 or not, so as to help the first and second parameter generating modules 32 and 33 to generate the first and second parameters u and v according to formulas (5) and (6).

In order to make the method proposed by the invention more comprehensible, an explicit embodiment is given below to describe the procedure of the method for line drawing.

Figure 5:
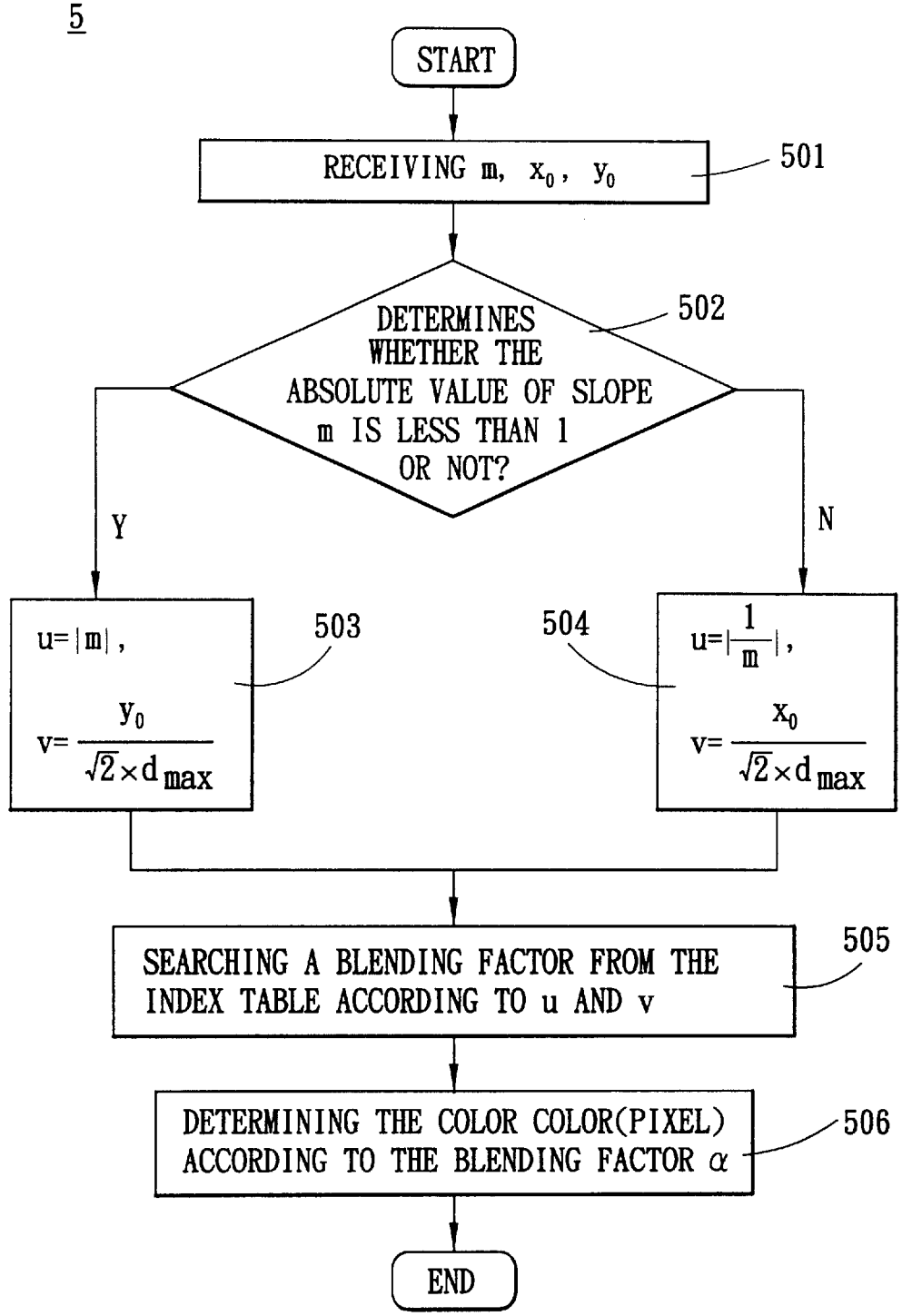
FIG. 5 is a flowchart showing the procedure of the method for line drawing according to a preferred embodiment of the invention.

As shown in FIG. 5, the method 5 for line drawing according to a preferred embodiment of this invention uses a plurality of pixels to display a line. In this case, the procedure for determining the color of each of these pixels includes the following steps.

First, the slope m of the line and the distances $x_0$ and $y_0$ are received in step 501. Then step 502 determines whether the absolute value of slope m is less than 1 or not. When the absolute value of slope m is less than 1, step 503 is then executed; when the absolute value of slope m is equal to or greater than 1, step 504 is then executed.

In step 503, the first parameter u and the second parameter v are respectively determined by slope m and the distances $x_0$ and $y_0$. In this step, the absolute value of slope m is less than 1. As mentioned in formulas (5) and (6), the first parameter u is equal to |m|, and the second parameter v is equal to $$\frac{y_0}{\sqrt{2} \times d_{\max}},$$

wherein $d_{max}$ is the width of the line.

On the other hand, in step 504, the first parameter u and the second parameter v are also determined by slope m and the distances $x_0$ and $y_0$, respectively. In this step, the absolute value of slope m is no less than 1. As mentioned in formulas (5) and (6), the first parameter u is equal to $\left|\frac{1}{m}\right|$, and the second parameter v is equal to $$\frac{x_0}{\sqrt{2} \times d_{max}}.$$

It should be noted that the values of the parameters u and v could be presented by 8-bit numbers. Therefore, the data stored in the index table 341 (as shown in FIG. 4) are limited to the maximum of 256×256 entries, without the need to store an excess amount of data in index table 341.

In step 505, a blending factor α is retrieved from the index table 341 according to the values of the first parameter u and the second parameter v generated in step 503 or 504. With reference to FIG. 4, for example, if the first parameter u and the second parameter v are respectively $u_2$ and $v_3$, the blending factor α generated by searching index table 341 is $\alpha_{23}$.

In step 506, the color Color(pixel) of this pixel is determined according to the blending factor α. In this case, the range of the blending factor α is limited between 0 and 1. As mentioned in formula (1), the blending factor α is used to determine the ratios of the line color Color(line) and background color Color(background) in the color Color(pixel) of this pixel. For example, when the blending factor α generated by searching index table 341 is $\alpha_{23}$, the color Color (pixel) of this pixel is then given by $\alpha_{23}\times$Color(line)+(1−$\alpha_{23}$)×Color(background).

A skilled individual should know that for some applications for displaying full line color, it is desirable to blend the pixel color Color(pixel) with only the line color Color(line), wherein the second parameter v is smaller than a preset value v'. In other words, the blending factor α is preset to 1 when the second parameter v is smaller than the preset value v'. Then, the pixel color Color(pixel) is given by:

$$\text{Color(pixel)} = \begin{cases} \text{Color(line)} & 0 \le v \le v' \\ \alpha \times \text{Color(line)} + (1-\alpha) \times \text{Color(background)}, & v' \le v \le 1 \end{cases}$$

Therefore, the values of α entries in index table 341 are adjusted accordingly. Furthermore, a skilled individual should also know that the apparatus and method for line drawing according to a preferred embodiment of this invention display a line shading region to represent the line. In this invention, the blending factor α is retrieved by searching the index table. Therefore, the apparatus and method according to a preferred embodiment of this invention do not execute complex calculations, so the calculation time can be reduced to avoid delay in displaying the image.

It should be mentioned that an individual familiar with the technologies could make equivalent changes and modifications without departing from the spirit and purview of the invention. For example, the second parameter v can be calculated according to the following formula (6'):

$$v = \begin{cases} \dfrac{y_0}{d_{max}}, & |m| < 1 \\ \dfrac{x_0}{d_{max}}, & |m| \ge 1 \end{cases} \quad (6')$$

As mentioned above, the range of the second parameter v becomes 0 to $\sqrt{2}$. In this case, the recorded data of the correlations between the second parameter and blending factor α, of index table 341 are fixed, so that the required blending factor α can be retrieved in the same way.

It is important to note that while the present invention has been described in the context of modules, those skilled in the art will appreciate that the apparatus of the present invention is capable of being distributed in the form of a computer readable medium of instructions in a variety of forms, and that the present invention applies equally regardless of the particular type of signal bearing media utilized to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links. Furthermore, although a software module represents each functional module in the above embodiment, a skilled person can make all or some of the software modules into a specific hardware, such as an ASIC (Application-Specific Integrated Circuit) chip to implement the same function.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for line drawing, which uses a plurality of pixels to display a line, comprising:
    a first parameter generating module, which generates a first parameter according to a slope of the line;
    a second parameter generating module, which generates a second parameter according to a distance between one of the pixels and the line in axial directions;
    a storage module, which stores an index table, wherein the index table records at least a blending factor and correlations between the first parameter, second parameter, and blending factor;
    a retrieving module, which searches the blending factor from the index table according to the first parameter and second parameter; and
    a calculating module, which determines a color of the pixel according to the blending factor.

2. The apparatus of claim 1, wherein the first parameter and the second parameter are both no greater than 1.

3. The apparatus of claim 1, further comprising:
    a receiving module, which receives the slope of the line and the distance between the pixels and the line in axial directions.

4. The apparatus of claim 1, further comprising:
    a determining module, which determines whether the absolute value of the slope m is less than 1 or not, wherein
    the first parameter generating module generates the first parameter equal to the absolute value of the slope when the absolute value of the slope is less than 1 and generates the first parameter equal to the reciprocal of the absolute value of slope when the absolute value of the slope is no less than 1; and
    the second parameter generating module generates the second parameter according to the distance between the pixel and the line in vertical axle direction when the absolute value of the slope is less than 1 and generates the second parameter according to the distance between the pixel and the line in traverse axle direction when the absolute value of the slope is no less than 1.

5. The apparatus of claim 4, wherein when the absolute value of the slope is less than 1, the second parameter generating module generates the second parameter according to the following formula:

$$v = \frac{y_0}{\sqrt{2} \times d_{\max}}$$

wherein, v means the second parameter, $y_0$ means the distance between the pixel and the line in vertical axle direction, and $d_{max}$ means the width of the line.

6. The apparatus of claim 4, wherein, when the absolute value of the slope is no less than 1, the second parameter generating module generates the second parameter according to the following formula:

$$v = \frac{x_0}{\sqrt{2} \times d_{\max}}$$

wherein, v means the second parameter, $x_0$ means the distance between the pixel and the line in horizontal axle direction, and $d_{max}$ means the width of the line.

7. The apparatus of claim 1, wherein the blending factor is less than 1 and is used to determine the ratios of a line color and a background color in the color of the pixel.

8. The apparatus of claim 7, wherein the calculating module determines the color of the pixel according to the following formula:

Color(pixel)=α×Color(line) +(1−α)×Color (background)

wherein, Color(pixel) means the color of the pixel, Color (line) means the line color, Color(background) means the background color, and α means the blending factor.

9. A method for line drawing, which uses a plurality of pixels to display a line, comprising:
generating a first parameter according to a slope of the line;
generating a second parameter according to a distance between one of the pixels and the line in axial directions;
searching for a blending factor from an index table according to the first parameter and the second parameter; and
determining a color of the pixel according to the blending factor, wherein the first parameter and the second parameter are both no greater than 1.

10. The method of claim 9, wherein the index table records the blending factor and correlations between the first parameter, second parameter, and blending factor.

11. The method of claim 9, wherein the value of the blending factor is pre-calculated using the following formula:

$$\alpha = \text{Index·table}\,(u, v) = 1 - \frac{\sqrt{2} \times v}{\sqrt{1 + u^2}}$$

wherein, α means the blending factor, u means the first parameter, and v means the second parameter.

12. The method of claim 9, further comprising:
receiving the slope of the line and the distance between the pixel and the line in axial directions.

13. The method of claim 9, further comprising:
determining whether the absolute value of the slope m is less than 1 or not, wherein
the first parameter is equal to the absolute value of the slope when the absolute value of the slope is less than 1 and is equal to the reciprocal of the absolute value of slope when the absolute value of the slope is no less than 1; and
the second parameter is generated according to the distance between the pixel and the line in vertical axle direction when the absolute value of the slope is less than 1 and is generated according to the distance between the pixel and the line in traverse axle direction when the absolute value of the slope is no less than 1.

14. The method of claim 13, wherein, when the absolute value of the slope is less than 1, the second parameter is generated according to the following formula:

$$v = \frac{y_0}{\sqrt{2} \times d_{\max}}$$

wherein, v means the second parameter, $y_0$ means the distance between the pixel and the line in vertical axle direction, and $d_{max}$ means the width of the line.

15. The method of claim 13, wherein, when the absolute value of the slope is no less than 1, the second parameter is generated according to the following formula:

$$v = \frac{x_0}{\sqrt{2} \times d_{\max}}$$

wherein, v means the second parameter, $x_0$ means the distance between the pixel and the line in traverse axle direction, and $d_{max}$ means the width of the line.

16. The method of claim 9, wherein, the blending factor is less than 1 and is used to determine the ratios of a line color and a background color in the color of the pixel.

17. The method of claim 16, wherein, the color of the pixel is determined according to the following formula:

Color(pixel)=α×Color(line)+(1−α)×Color(background)

wherein, Color(pixel) means the color of the pixel, Color (line) means the line color, Color(background) means the background color, and α means the blending factor.

18. The method of claim 9, wherein the value of the blending factor is preset to 1 for a certain range of the second parameter.

* * * * *